(12) United States Patent
Neubacher

(10) Patent No.: US 10,555,337 B2
(45) Date of Patent: Feb. 4, 2020

(54) DETECTING DEVICE FOR DETECTING A PHYSICAL QUANTITY

(71) Applicant: Deutsche Telekom AG, Bonn (DE)

(72) Inventor: Andreas Neubacher, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 74 days.

(21) Appl. No.: 15/648,576

(22) Filed: Jul. 13, 2017

(65) Prior Publication Data

US 2018/0020477 A1    Jan. 18, 2018

(30) Foreign Application Priority Data

Jul. 14, 2016  (EP) ..................................... 16179525

(51) Int. Cl.
| | |
|---|---|
| *G05B 19/418* | (2006.01) |
| *H04W 74/04* | (2009.01) |
| *H04W 74/00* | (2009.01) |
| *H04Q 9/02* | (2006.01) |
| *H04L 29/08* | (2006.01) |

(52) U.S. Cl.
CPC .............. *H04W 74/04* (2013.01); *H04Q 9/02* (2013.01); *H04W 74/006* (2013.01); *H04Q 2209/40* (2013.01); *H04Q 2209/826* (2013.01)

(58) Field of Classification Search
None
See application file for complete search history.

(56) References Cited

U.S. PATENT DOCUMENTS 6,611,755 B1 *  8/2003  Coffee ..................... B28C 5/422
340/438

FOREIGN PATENT DOCUMENTS

| EP | 2685744 | * | 1/2014 |
|---|---|---|---|
| EP | 2685744 A1 | | 1/2014 |

OTHER PUBLICATIONS

Yohannes I. Laveyne, et al., "Wireless synchronization for low cost wireless sensor networks using DCF77", Proceedings of the IEEE Young Researchers Symposium, Apr. 24, 2014-Apr. 25, 2014, pp. 1-5 (Year: 2014).*

(Continued)

*Primary Examiner* — Ayaz R Sheikh
*Assistant Examiner* — Sori A Aga
(74) *Attorney, Agent, or Firm* — Leydig, Voit & Mayer, Ltd.

(57) ABSTRACT

A detecting device for detecting a physical quantity includes: a detector, configured to detect the physical quantity and to output data representing the physical quantity; a memory, configured to store a communications profile of the detecting device, wherein the communications profile defines a predetermined transmission time for the transmission of the data, wherein the predetermined transmission time is assigned to the detecting device; and a communications interface, configured to transmit the data to a predetermined target network address at the predetermined transmission time via a communications network. The communications interface is further configured to receive a broadcast signal from a server entity via the communications network, wherein the broadcast signal comprises a further communications profile assigned to the detecting device for modifying the communications profile of the detecting device.

12 Claims, 12 Drawing Sheets

(56) References Cited

OTHER PUBLICATIONS

Johannes I. Laveyne, et al., "Wireless synchronization for low cost wireless sensor networks using DCF77", Proceedings of the IEEE Young Researchers Symposium, Apr. 24, 2014-Apr. 25, 2014, pp. 1-5.

* cited by examiner

DETECTING DEVICE FOR DETECTING A PHYSICAL QUANTITY

CROSS-REFERENCE TO RELATED APPLICATIONS

Priority is claimed to European Patent Application No. EP 16179525.7, filed on Jul. 14, 2016, the entire disclosure of which is hereby incorporated by reference herein.

FIELD

The present invention relates to the field of detection of a physical quantity and the transfer of data representing the physical quantity via a communications network.

BACKGROUND

The term 'Internet of Things' (IoT) is understood to mean the networking of physical objects via a communications network, whereby, for example, a more efficient monitoring of the physical objects and an exchange of information relating to the physical objects are made possible.

The Internet of Things is becoming increasingly important, in particular in the field of home automation technology and industry automation technology, wherein the intention is for different physical quantities, such as a temperature or an energy consumption, to be efficiently detected. In the field of home automation technology, heating sensors for the billing of heating costs for example are being increasingly provided with corresponding functionality. In the field of industry automation, the intention is for production sequences to be optimized and performed more efficiently, for example. Corresponding approaches for this purpose are summarized for the most part under the term Industry 4.0, for example.

Economical apparatuses are usually used for the detection of the physical quantity and for the transfer of the data representing the physical quantity. Here, the access to the communications channel is not typically controlled via complex media access control (MAC) methods. The data representing the physical quantity is therefore for the most part transmitted in an uncoordinated form. However, this can lead to collisions and losses of data over the communications channel.

Document EP 2 685 744 A1 describes a method for allocating timeslots for sensor nodes in a wireless sensor node network in the field of industrial process control, wherein the timeslots are arranged in a superordinate superframe.

SUMMARY

In an exemplary embodiment, the present invention provides a detecting device for detecting a physical quantity. The detecting device includes: a detector, configured to detect the physical quantity and to output data representing the physical quantity; a memory, configured to store a communications profile of the detecting device, wherein the communications profile defines a predetermined transmission time for the transmission of the data, wherein the predetermined transmission time is assigned to the detecting device; and a communications interface, configured to transmit the data to a predetermined target network address at the predetermined transmission time via a communications network. The communications interface is further configured to receive a broadcast signal from a server entity via the communications network, wherein the broadcast signal comprises a further communications profile assigned to the detecting device for modifying the communications profile of the detecting device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
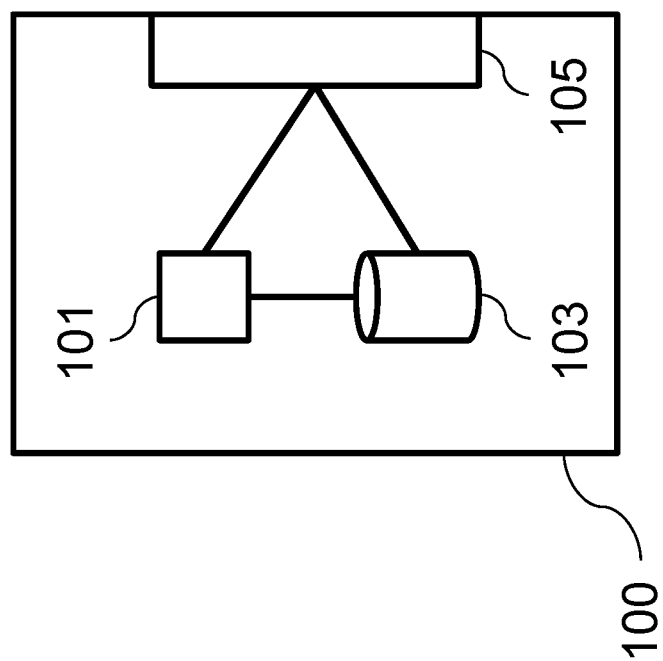
FIG. 1 shows a schematic diagram of a detecting device for detecting a physical quantity in accordance with one embodiment.

Exemplary embodiments of the present invention provide for efficient media access control over a communications channel.

In an exemplary embodiment, the present invention provides a detecting device in which there is stored a communications profile of the detecting device, wherein the communications profile defines at least one predetermined transmission time for the transmission of the data. A predetermined transmission period length can also be defined by the communications profile, and the data can be periodically transmitted on the basis of this transmission period length.

The detecting device can communicate via a communications network with a server entity, which can manage the predetermined transmission times of a group of detecting devices. The communications profile of a detecting device can additionally be updated by the server entity via the communications network.

As a result, access of the group of detecting devices to the communications channel can be efficiently controlled, and at the same time an economical implementation of the individual detecting devices is possible.

In accordance with a first aspect, the invention relates to a detecting device for detecting a physical quantity, comprising a detector for detecting the physical quantity, wherein the detector is configured to output data representing the physical quantity, a memory, in which there is stored a communications profile of the detecting device, wherein the communications profile defines at least one predetermined transmission time for the transmission of the data, wherein the predetermined transmission time is assigned to the detecting device, and a communications interface, which is configured to transmit the data to a predetermined target network address at the predetermined transmission time via a communications network. This results in the advantage that efficient media access control over a communications channel can be provided.

The target network address can be an Internet protocol (IP) address, for example an IPv4 address or an IPv6 address.

In accordance with one embodiment the detector is configured to determine a temperature, a moisture, an energy, a power, a position, a speed, an acceleration, an angle, an angular velocity, an angular acceleration, a rotational speed, a force, a torque, an energy consumption, a water consumption, a heat consumption, or a fuel consumption as a physical quantity. For this purpose, the detector can comprise a sensor for determining the physical quantity. This results in the advantage that physical quantities which are of importance in the field of home automation technology and in the field of industry automation technology can be efficiently determined.

In accordance with one embodiment, the predetermined transmission time defines the start of a free transmission timeslot, wherein the free transmission timeslot has a predetermined transmission timeslot length, and wherein the communications interface is configured to transmit the data within the free transmission timeslot. This results in the advantage that a transmission timeslot can be used for the transfer of the data.

In accordance with one embodiment, the communications profile also defines a predetermined transmission period length, wherein the predetermined transmission period length indicates a time difference between a further predetermined transmission time and the predetermined transmission time, and wherein the communications interface is also configured to transmit the data at the further predetermined transmission time. This results in the advantage that a periodic transmission of the data can be provided.

In accordance with one embodiment, the further predetermined transmission time defines the start of a further free transmission timeslot, wherein the further free transmission timeslot has the predetermined transmission timeslot length, and wherein the communications interface is configured to transmit the data within the further free transmission timeslot. This results in the advantage that a further transmission timeslot can be used for the transfer of the data.

In accordance with one embodiment, the detecting device is assigned a predetermined identifier, wherein the detector is configured to link the data to the predetermined identifier, and wherein the communications interface is configured to transmit the data with the predetermined identifier at the predetermined transmission time. This results in the advantage that the transmitted data can be efficiently assigned to the detecting device, for example by a server entity.

The predetermined identifier can be permanently assigned to the detecting device at the time of production thereof The predetermined identifier can, by way of example, be a media access control (MAC) address or an international mobile station equipment identity (IMEI) number assigned to the detecting device.

In accordance with one embodiment, the detecting device is assigned a network address, wherein the predetermined identifier of the detecting device is the network address of the detecting device. This results in the advantage that the transmitted data can be efficiently assigned to the detecting device, for example by a server entity.

The network address can be allocated to the detecting device by way of example by the server entity via the communications network. The network address of the detecting device can be an Internet protocol (IP) address, for example an IPv4 address or an IPv6 address.

In accordance with one embodiment, the detector is configured to compare the detected physical quantity with a predetermined physical reference quantity, wherein the communications interface is configured to transmit the data at the predetermined transmission time if the detected physical quantity exceeds the predetermined physical reference quantity. This results in the advantage that an efficient monitoring of the physical quantity by the detecting device can be provided. The data is consequently only transmitted if the detected physical quantity exceeds the predetermined physical reference quantity.

In accordance with one embodiment, the communications interface is configured to receive a broadcast signal from a server entity via the communications network, wherein the broadcast signal comprises a further communications profile, wherein the further communications profile is assigned to the detecting device, and wherein the communications interface is configured to modify the communications profile on the basis of the further communications profile, in particular to replace the communications profile by the further communications profile. This results in the advantage that the communications profile can be efficiently updated.

In accordance with one embodiment, the communications interface is configured to receive a synchronization signal, in particular a synchronization pulse, from a server entity via the communications network, wherein the communications interface is configured to modify the communications profile on the basis of the synchronization signal. This results in the advantage that the communications profile can be efficiently updated.

The synchronization signal, in particular the synchronization pulse, can indicate the free transmission timeslot and/or the further free transmission timeslot, by way of example.

In accordance with one embodiment, the memory is a read-only memory, wherein the communications profile of the detecting device is stored in the memory in a hard-wired manner. This results in the advantage that the detecting device can be efficiently implemented.

The communications profile can be stored in the read-only memory at the time of production of the detecting device. The read-only memory (ROM) is a memory that allows only read access during operation.

In accordance with one embodiment, the detecting device comprises a timer, in particular a real-time clock, for providing a time signal, wherein the time signal indicates a time difference between a current time and a predetermined reference time, and wherein the communications interface is configured to determine the predetermined transmission time for the transmission of the data on the basis of the time signal. This results in the advantage that the provision of an external time signal can be spared and the predetermined transmission time for the transmission of the data can be efficiently determined by the detecting device.

In accordance with one embodiment, the communications interface is configured to receive a time synchronization signal from a server entity via the communications network, wherein the timer is configured to modify the time signal on the basis of the received time synchronization signal. This results in the advantage that a plurality of timers can be efficiently synchronized in respect of the same reference time.

In accordance with one embodiment, the timer comprises a satellite navigation receiver, in particular a Global Positioning System (GPS) satellite navigation receiver or a GALILEO satellite navigation receiver, wherein the satellite navigation receiver is configured to provide a time synchronization signal, and wherein the timer is configured to modify the time signal on the basis of the provided time synchronization signal. This results in the advantage that a plurality of timers can be efficiently synchronized in respect of the same reference time.

In accordance with one embodiment, the timer comprises a time signal receiver, in particular a DCF77 receiver, wherein the time signal receiver is configured to provide a time synchronization signal, and wherein the timer is configured to modify the time signal on the basis of the provided time synchronization signal. This results in the advantage that a plurality of timers can be efficiently synchronized in respect of the same reference time.

In accordance with one embodiment, the communications network comprises a plurality of sub-networks, wherein the communications interface is configured to transmit the data to the predetermined target network address via a sub-network from the plurality of sub-networks. This results in the advantage that the plurality of sub-networks can be configured for different applications and a more efficient transfer of the data via the communications network can be provided.

In accordance with one embodiment, the communications network is a communications network of the fifth generation (5G) or a further generation, wherein each sub-network is a slice of the communications network. This results in the advantage that an efficient transfer of the data via a communications network of the fifth generation (5G) or a further generation can be provided.

In accordance with a second aspect, the invention relates to a group of detecting devices, wherein each detecting device is assigned a predetermined transmission time for the transmission of data, and wherein the predetermined transmission times are different. This results in the advantage that efficient media access control over a communications channel can be provided.

In accordance with one embodiment, the predetermined transmission times are arranged within a transmission interval. This results in the advantage that a transfer of the data can be limited temporally to the transmission interval.

In accordance with a third aspect, the invention relates to a server entity for communicating with a detecting device via a communications network, wherein the detecting device is configured to detect a physical quantity and to output data representing the physical quantity, wherein a communications profile of the detecting device is stored in the detecting device, wherein the communications profile defines at least one predetermined transmission time for the transmission of the data, wherein the predetermined transmission time is assigned to the detecting device, wherein the detecting device is configured to transmit the data to a predetermined target network address at the predetermined transmission time via the communications network, comprising a processor configured to determine a further communications profile of the detecting device, wherein the further communications profile is assigned to the detecting device, and to generate a broadcast signal, wherein the broadcast signal comprises the further communications profile, and a communications interface configured to transmit the broadcast signal to the detecting device via the communications network. This results in the advantage that the communications profile can be efficiently updated in the detecting device.

The server entity can be configured to manage predetermined transmission times and/or transmission timeslots of a plurality of detecting devices.

The server entity can be a base station, wherein the base station is configured to communicate with the detecting device via a radio communications network as communications network. The server entity can also be a controller, wherein the controller is assigned a backhaul network of the communications network.

In accordance with one embodiment, the server entity comprises a timer, in particular a real-time clock, for providing a time signal, wherein the time signal indicates a time difference between a current time and a predetermined reference time, wherein the processor is configured to generate a time synchronization signal on the basis of the time signal, and wherein the communications interface is configured to transmit the time synchronization signal to the detecting device via the communications network. This results in the advantage that a plurality of timers in various detecting devices can be efficiently synchronized in respect of the same reference time.

In accordance with one embodiment, the communications interface is configured to receive an occupancy signal from a further server entity via the communications network, wherein the occupancy signal indicates an occupied transmission time, and wherein the processor is configured to determine the further communications profile of the detecting device on the basis of the occupancy signal. This results in the advantage that an efficient management of free transmission times and/or occupied transmission times can be provided.

In accordance with one embodiment, the processor is configured to determine an occupied transmission time and to generate an occupancy signal for transmission to a further server entity, wherein the occupancy signal indicates the occupied transmission time, and wherein the communications interface is configured to transmit the occupancy signal to the further server entity via the communications network. This results in the advantage that an efficient management of free transmission times and/or occupied transmission times can be provided.

In accordance with a fourth aspect, the invention relates to a communications system, comprising a group of detecting devices, wherein each detecting device within the group is assigned a predetermined transmission time for the transmission of data within a transmission interval, and wherein the predetermined transmission times are different, and a server entity configured to communicate with each detecting device within the group via a communications network. This results in the advantage that efficient media access control over a communications channel can be provided.

In accordance with one embodiment, each detecting device within the group is configured to transmit the data in each case to the same predetermined target network address, wherein the predetermined target network address is assigned to the server entity. This results in the advantage that the data can be efficiently evaluated and stored by the server entity.

In accordance with one embodiment, the communications system comprises a further group of detecting devices, wherein each detecting device within the further group is assigned a predetermined transmission time for the transmission of data within the transmission interval or within a further transmission interval, and wherein the predetermined transmission times are different, and a further server entity configured to communicate with each detecting device within the further group via the communications network. This results in the advantage that the predetermined transmission times of the group and also the predetermined transmission times of the further group can be efficiently managed.

The server entity and the further server entity can communicate with one another via the communications network. The server entity and the further server entity can exchange occupancy signals with one another, which signals indicate transmission times occupied by the server entity in question.

In accordance with one embodiment, the transmission interval and the further transmission interval follow one another chronologically. This results in the advantage that an overlap of the transmission intervals and/or a collision of data can be efficiently prevented.

In accordance with one embodiment, each detecting device within the further group is configured to transmit data in each case to the same further predetermined target network address, wherein the further predetermined target network address is assigned to the further server entity. This results in the advantage that the data can be efficiently evaluated and stored by the further server entity.

In accordance with one embodiment, the communications network is a communications network of the fifth generation (5G) or a further generation, wherein the communications network comprises a sub-network, in particular a slice, and a further sub-network, in particular a further slice, wherein the group of detecting devices and the server entity are assigned to the sub-network, and wherein the further group of detecting devices and the further server entity are assigned to the further sub-network. This results in the advantage that an efficient transfer of the data via a communications network of the fifth generation (5G) or a further generation can be provided.

In accordance with a fifth aspect, the invention relates to a method for detecting a physical quantity using a detecting device, wherein the detecting device comprises a detector, a memory, and a communications interface, wherein a communications profile of the detecting device is stored in the memory, wherein the communications profile defines at least one predetermined transmission time for the transmission of data, wherein the predetermined transmission time is assigned to the detecting device, said method comprising a detection of the physical quantity by the detector, an output by the detector of the data representing the physical quantity, and a transmission of the data to a predetermined target network address by the communications interface at the predetermined transmission time via a communications network. This results in the advantage that efficient media access control over a communications channel can be provided.

The method can be carried out by the detecting device. Further features of the method result directly from the functionality and/or the features of the detecting device.

In accordance with a sixth aspect, the invention relates to a method for communicating with a detecting device via a communications network with use of a server entity, wherein the server entity comprises a processor and a communications interface, wherein the detecting device is configured to detect a physical quantity and to output data representing the physical quantity, wherein a communications profile of the detecting device is stored in the detecting device, wherein the communications profile defines at least one predetermined transmission time for the transmission of the data, wherein the predetermined transmission time is assigned to the detecting device, wherein the detecting device is configured to transmit the data to a predetermined target network address at the predetermined transmission time via the communications network, said method comprising a determination of a further communications profile of the detecting device by the processor, wherein the further communications profile is assigned to the detecting device, a generation of a broadcast signal by the processor, wherein the broadcast signal comprises the further communications profile, and a transmission of the broadcast signal to the detecting device by the communications interface via the communications network. This results in the advantage that the communications profile can be efficiently updated in the detecting device.

The method can be carried out by the server entity. Further features of the method result directly from the functionality and/or the features of the server entity.

In accordance with a seventh aspect, the invention relates to a computer program comprising a program code for carrying out the method for detecting a physical quantity or the method for communicating with a detecting device, when the program code is run on a computer. This results in the advantage that the method can be carried out in an automated manner.

The detecting device and/or the server entity can be programmed to run the program code.

The invention can be provided in hardware and/or in software.

FIG. 1 shows a schematic diagram of a detecting device 100 for detecting a physical quantity in accordance with one embodiment.

The detecting device 100 comprises a detector 101 for detecting the physical quantity, wherein the detector 101 is configured to output data representing the physical quantity. The detecting device 100 also comprises a memory 103, in which there is stored a communications profile of the detecting device 100, wherein the communications profile defines at least one predetermined transmission time for the transmission of the data, wherein the predetermined transmission time is assigned to the detecting device 100. The detecting device 100 additionally comprises a communications interface 105, which is configured to transmit the data to a predetermined target network address at the predetermined transmission time via a communications network.

The detecting device 100 can also comprise a timer, in particular a real-time clock, for providing a time signal. The time signal indicates a time difference between a current time and a predetermined reference time. The communications interface 105 is configured to determine the predetermined transmission time for the transmission of the data on the basis of the time signal.

Figure 2:
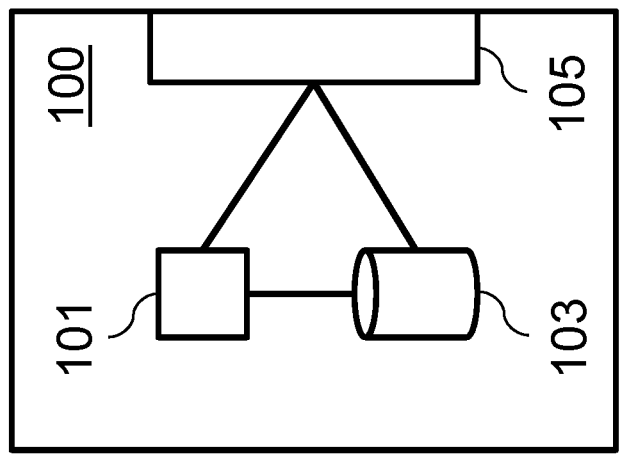
FIG. 2 shows a schematic diagram of a group of detecting devices for detecting a physical quantity in accordance with one embodiment.
Figure 2:
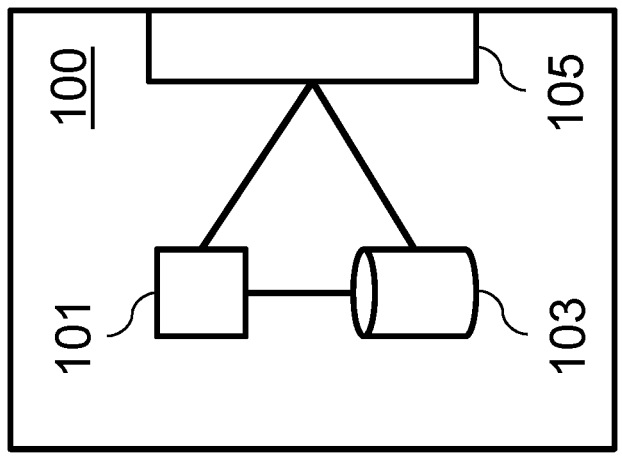
Figure 2:
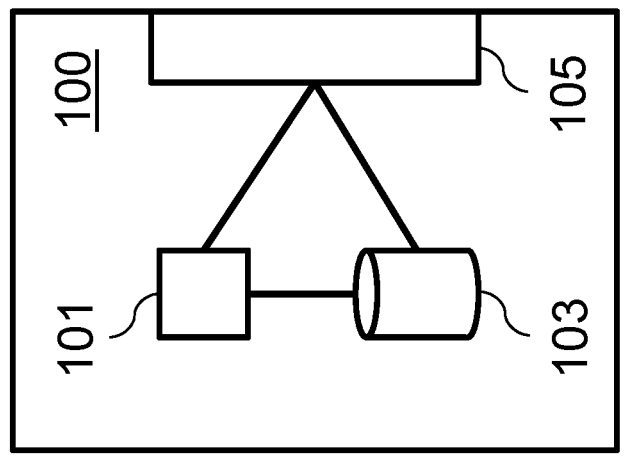

FIG. 2 shows a schematic diagram of a group 200 of detecting devices 100 for detecting a physical quantity in accordance with one embodiment.

Each detecting device 100 comprises a detector 101, a memory 103, and a communications interface 105. Each detecting device 100 is assigned a predetermined transmission time for the transmission of data. The predetermined transmission times of the detecting devices 100 within the group 200 are different. The predetermined transmission times can be arranged within a transmission interval.

Figure 3:
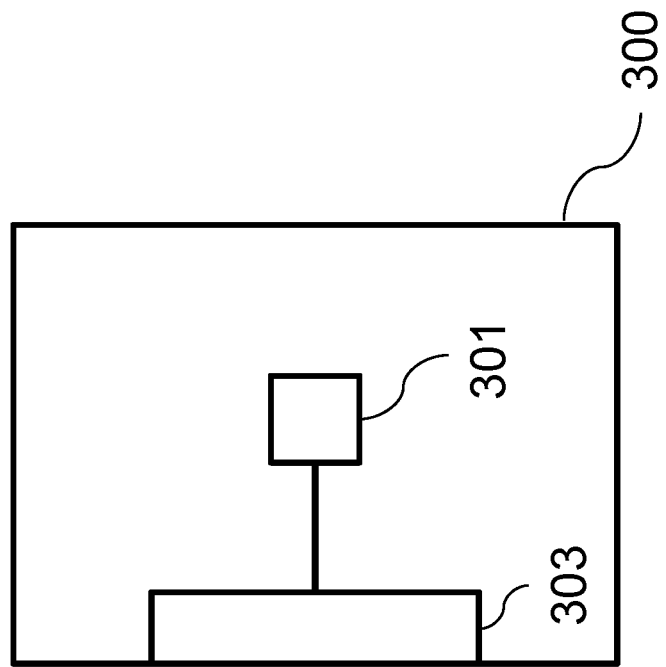
FIG. 3 shows a schematic diagram of a server entity for communicating with a detecting device via a communications network in accordance with one embodiment.

FIG. 3 shows a schematic diagram of a server entity 300 for communicating with a detecting device via a communications network in accordance with one embodiment.

The detecting device is configured to detect a physical quantity and to output data representing the physical quantity. A communications profile of the detecting device is stored in the detecting device, wherein the communications profile defines at least one predetermined transmission time for the transmission of the data, and wherein the predetermined transmission time is assigned to the detecting device. The detecting device is configured to transmit the data to a predetermined target network address at the predetermined transmission time via the communications network.

The server entity 300 comprises a processor 301 configured to determine a further communications profile of the detecting device, wherein the further communications profile is assigned to the detecting device, and to generate a broadcast signal, wherein the broadcast signal comprises the further communications profile. The server entity 300 also comprises a communications interface 303 configured to transmit the broadcast signal to the detecting device via the communications network.

Figure 4:
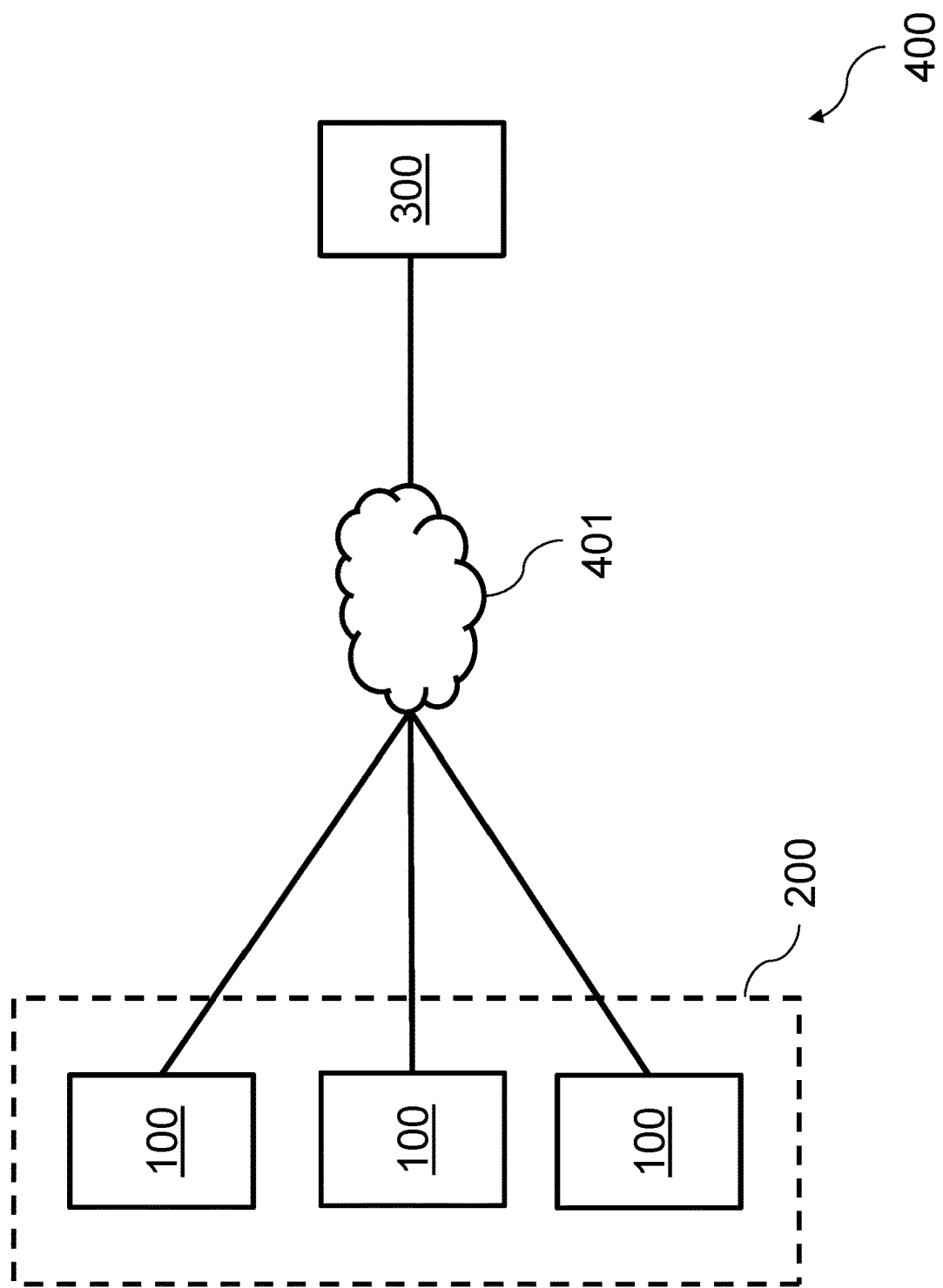
FIG. 4 shows a schematic diagram of a communications system in accordance with one embodiment.

FIG. 4 shows a schematic diagram of a communications system 400 in accordance with one embodiment.

The communications system 400 comprises a group 200 of detecting devices 100, wherein each detecting device 100 within the group 200 is assigned a predetermined transmission time for the transmission of data within a transmission interval, and wherein the predetermined transmission times are different. The communications system 400 also comprises a server entity 300 configured to communicate with each detecting device 100 within the group 200 via a communications network 401.

Figure 5:
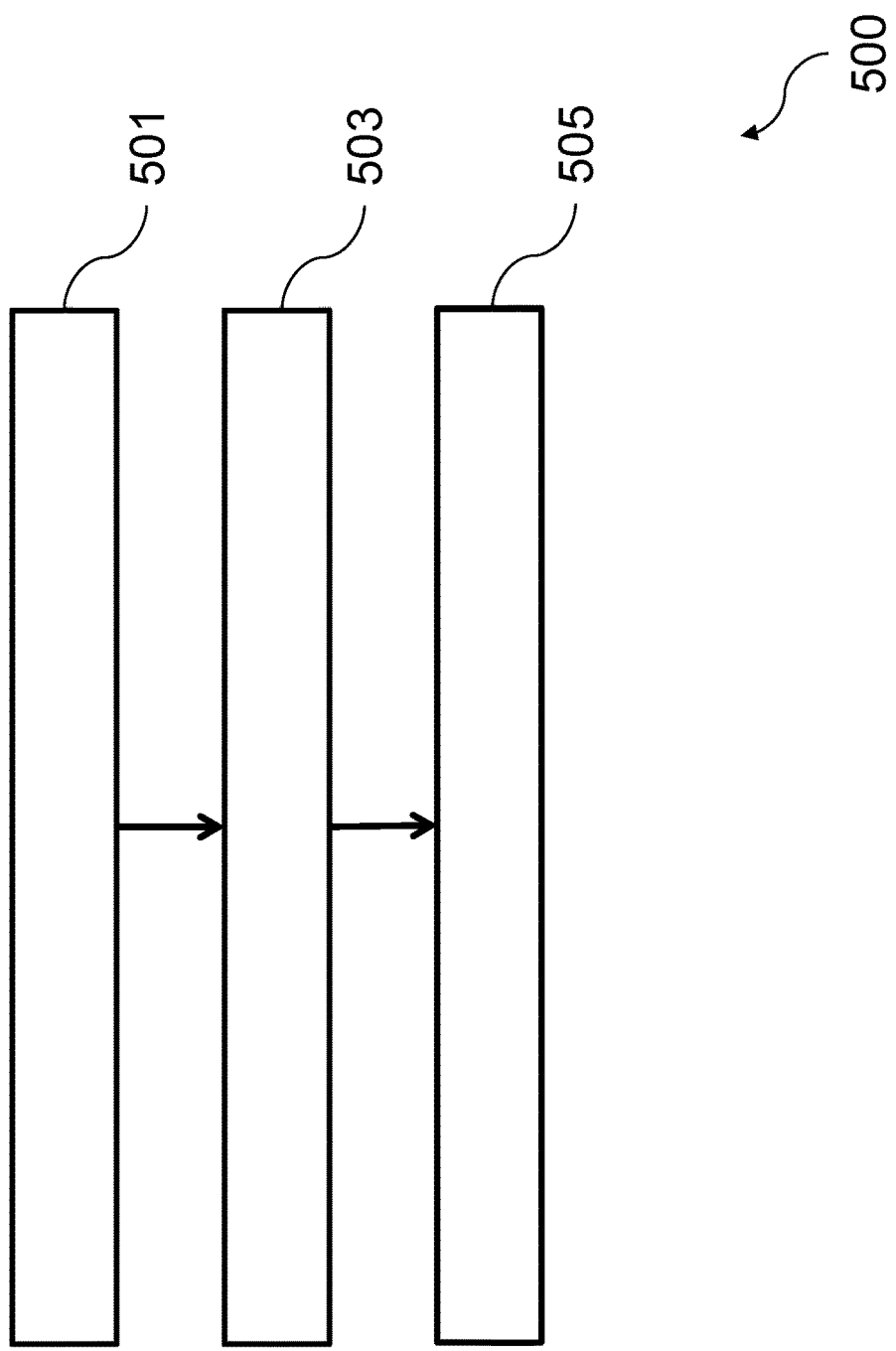
FIG. 5 shows a flowchart of a method for detecting a physical quantity using a detecting device in accordance with one embodiment.

FIG. 5 shows a schematic diagram of a method 500 for detecting a physical quantity using a detecting device in accordance with one embodiment.

The detecting device comprises a detector, a memory, and a communications interface, wherein a communications profile of the detecting device is stored in the memory, wherein the communications profile defines at least one predetermined transmission time for the transmission of data, and wherein the predetermined transmission time is assigned to the detecting device.

The method 500 comprises a detection 501 of the physical quantity by the detector, an output 503 by the detector of the data representing the physical quantity, and a transmission 505 of the data to a predetermined target network address by the communications interface at the predetermined transmission time via a communications network.

Figure 6:
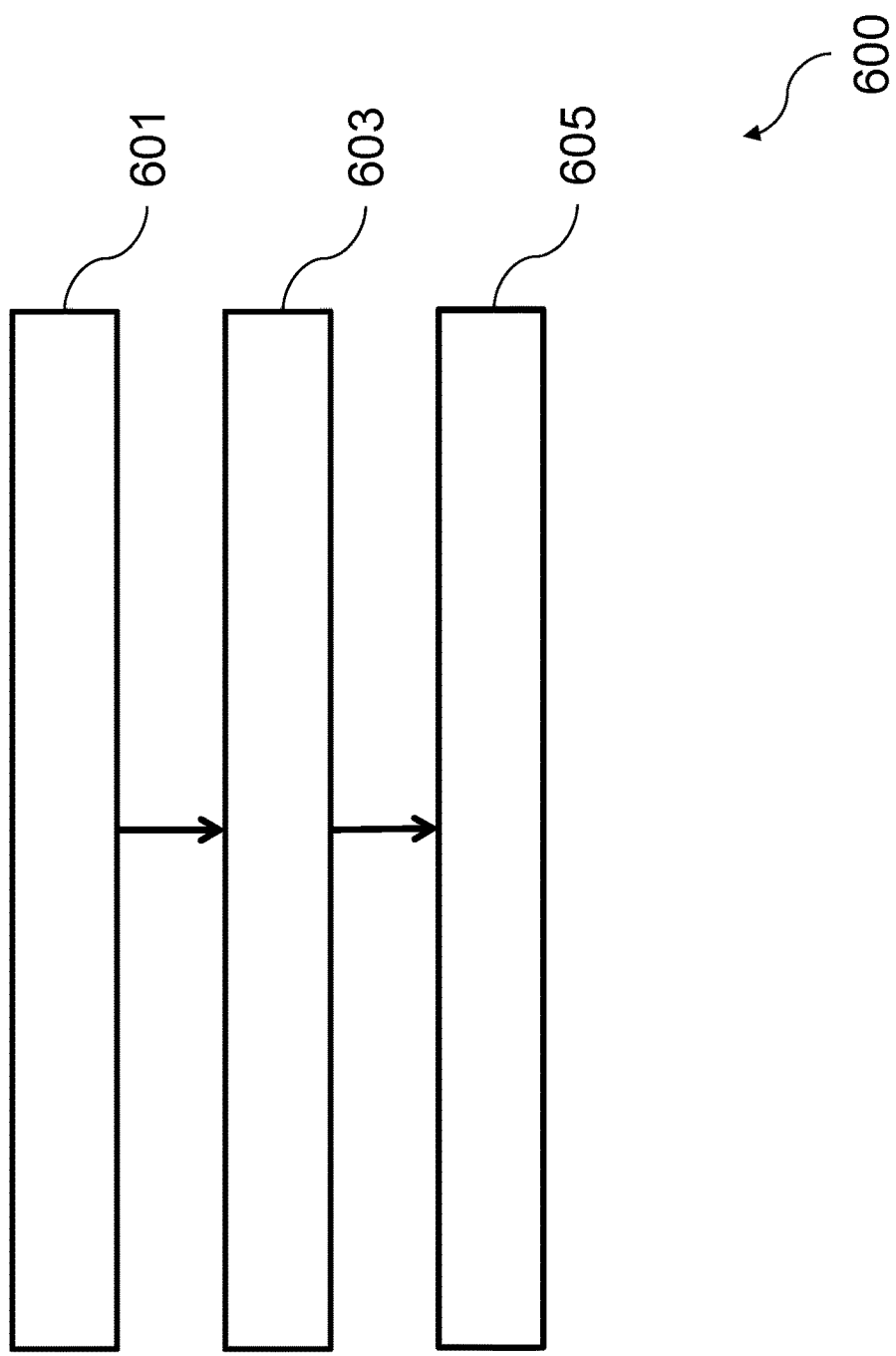
FIG. 6 shows a flowchart of a method for communicating with a detecting device via a communications network with use of a server entity in accordance with one embodiment.

FIG. 6 shows a schematic diagram of a method 600 for communicating with a detecting device via a communications network with use of a server entity in accordance with one embodiment. The server entity comprises a processor and a communications interface.

The detecting device is configured to detect a physical quantity and to output data representing the physical quantity. A communications profile of the detecting device is stored in the detecting device, wherein the communications profile defines at least one predetermined transmission time for the transmission of the data, wherein the predetermined transmission time is assigned to the detecting device. The detecting device is configured to transmit the data to a predetermined target network address at the predetermined transmission time via the communications network.

The method 600 comprises a determination 601 by the processor of a further communications profile of the detecting device, wherein the further communications profile is assigned to the detecting device, a generation 603 by the processor of a broadcast signal, wherein the broadcast signal comprises the further communications profile, and a transmission 605 of the broadcast signal to the detecting device by the communications interface via the communications network.

Figure 7:
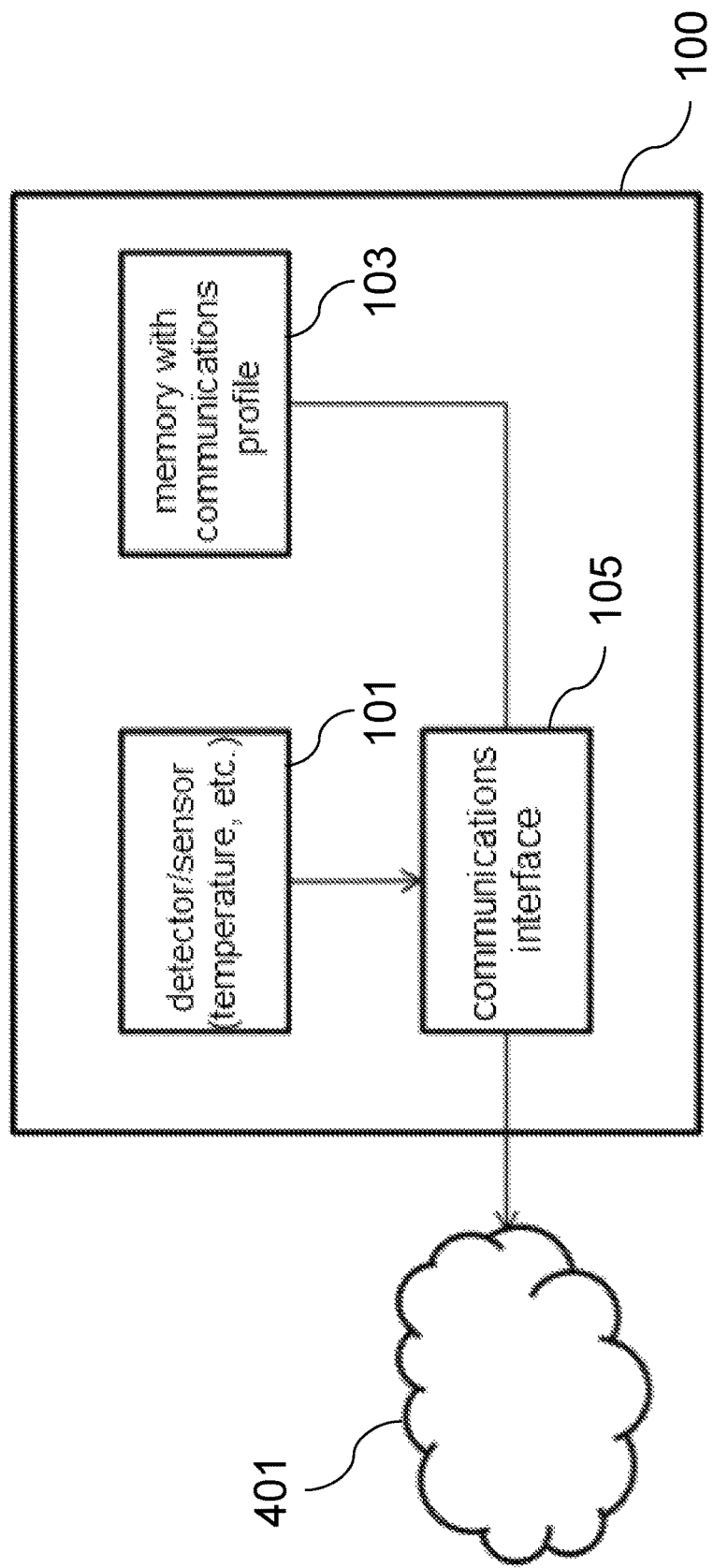
FIG. 7 shows a schematic diagram of a detecting device for detecting a physical quantity in accordance with one embodiment.

FIG. 7 shows a schematic diagram of a detecting device 100 for detecting a physical quantity in accordance with one embodiment.

The detecting device 100 comprises a detector 101 for detecting the physical quantity, wherein the detector 101 is configured to output data representing the physical quantity. The detecting device 100 also comprises a memory 103, in which there is stored a communications profile of the detecting device 100, wherein the communications profile defines at least one predetermined transmission time for the transmission of the data, wherein the predetermined transmission time is assigned to the detecting device 100. The detecting device 100 additionally comprises a communications interface 105 configured to transmit the data to a predetermined target network address at the predetermined transmission time via a communications network 401.

Figure 8:
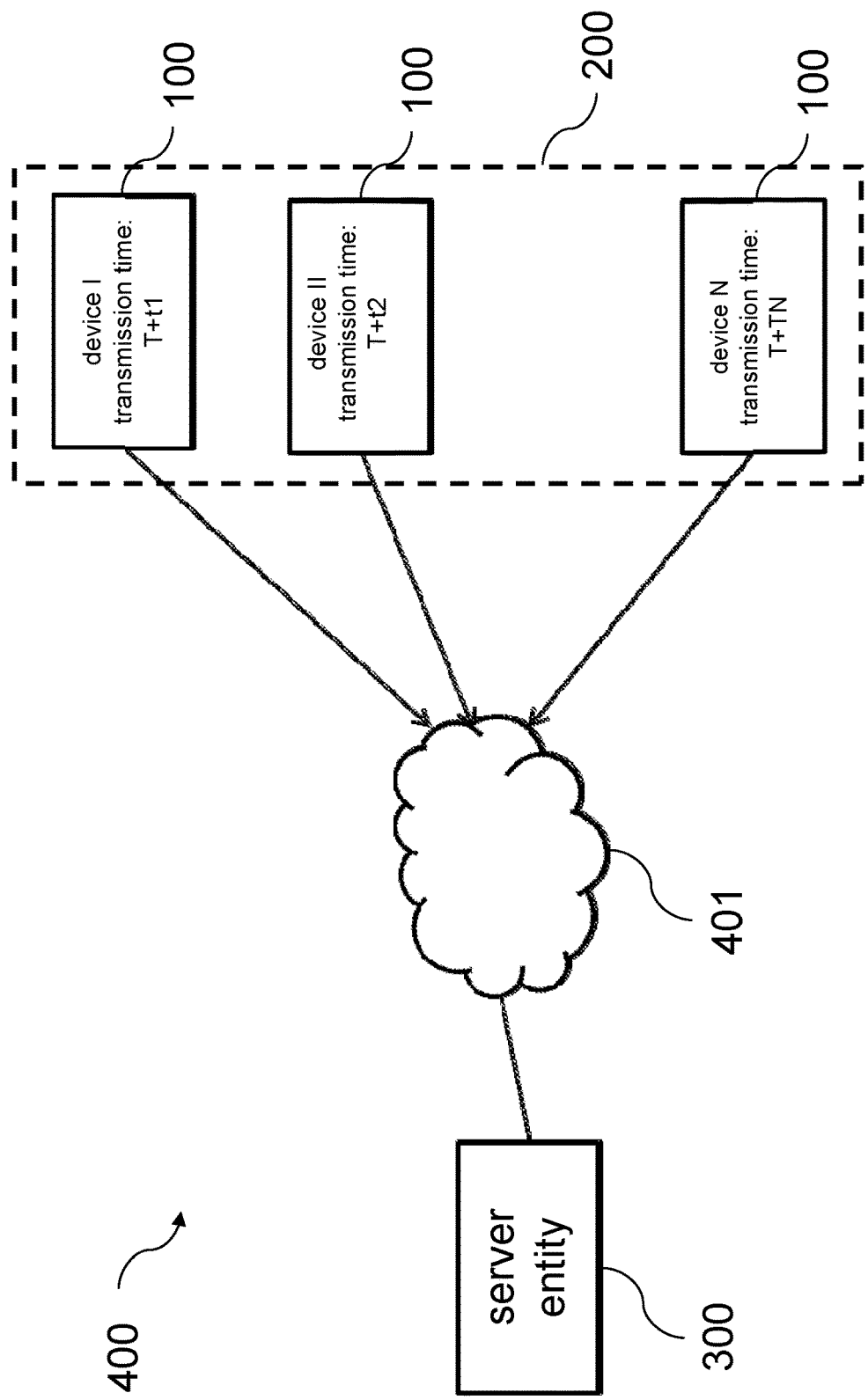
FIG. 8 shows a schematic diagram of a communications system in accordance with one embodiment.

FIG. 8 shows a schematic diagram of a communications system 400 in accordance with one embodiment.

The communications system 400 comprises a group 200 of detecting devices 100, wherein each detecting device 100 within the group 200 is assigned a predetermined transmission time for the transmission of data within a transmission interval, and wherein the predetermined transmission times are different. A first detecting device 100 is configured to transmit data at the predetermined transmission time T+t1. A second detecting device 100 is configured to transmit data at the predetermined transmission time T+t2. An $N^{th}$ detecting device 100 is configured to transmit data at the predetermined transmission time T+tN. The transmission period length T can be defined by the specific communications profile. The communications system 400 also comprises a server entity 300 configured to communicate with each detecting device 100 within the group 200 via a communications network 401. The maximum number of detecting devices can be determined by the transmission period length T and the length of the transmission timeslots.

Each detecting device 100 within the group 200 can be allocated fixed transmission times, repeated periodically as appropriate. Each detecting device 100 consequently has its own identity, which is assigned a corresponding communications profile. Each detecting device 100 can transmit its corresponding data in transmission timeslots, which can be permanently assigned to the detecting device 100 in question. The assignment can be made by way of example by the server entity 300. This results in the advantage that a return channel for the communication can be spared.

The initialization of the communications profiles and the allocation of the transmission timeslots to the communications profiles can be performed by way of example by a broadcast signal of the server entity 300 to all detecting devices 100 within the group 200. The broadcast signal can comprise in each case a further communications profile for each detecting device 100, which communications profile can indicate free transmission times and/or free transmission timeslots. Each detecting device 100 can update its corresponding communications profile on the basis of the corresponding further communications profile. A further possibility for this lies in the transmission of a synchronization signal, in particular a synchronization pulse, by the server entity 300 in order to indicate free transmission times and/or transmission timeslots. A transmission time and/or transmission timeslot can also be defined at the time of set-up of a specific detecting device 100 for the group 200.

A predetermined identifier of the detecting device 100 for the assignment of the data can also be transmitted together with the data. The communication between each detecting device 100 within the group 200 and the server entity 300 can be narrowband communication (i.e., can occur with a very low data rate).

The communications network 401 can be a wireless communications network or a wired communications network. The communication can occur by way of example with use of an IEEE 802.11 communications standard (wireless local area network, WLAN), an IEEE 802.15.1 communications standard (Bluetooth), a digital subscriber line (DSL) communications standard, or a $3^{rd}$ Generation Partnership Project (3GPP) communications standard. In particular, the communication can be carried out with use of a mobile radio standard of the fifth generation (5G) or a further generation.

A number of advantages are provided as a result. The communications system 400 can be implemented economically. At the same time, collisions of the data over the communications channel can be avoided. The communications system 400 enables a high volume data rate, whereby a high number of detecting devices can be supported. For the communication via the communications network 401, a return channel can be spared. Furthermore, there is no need for any acknowledgements (ACKs). As appropriate, one communications channel is sufficient for the transfer of the data via the communications network 401. A simple modulation, for example an amplitude modulation or a phase modulation, can also be used.

Figure 9:
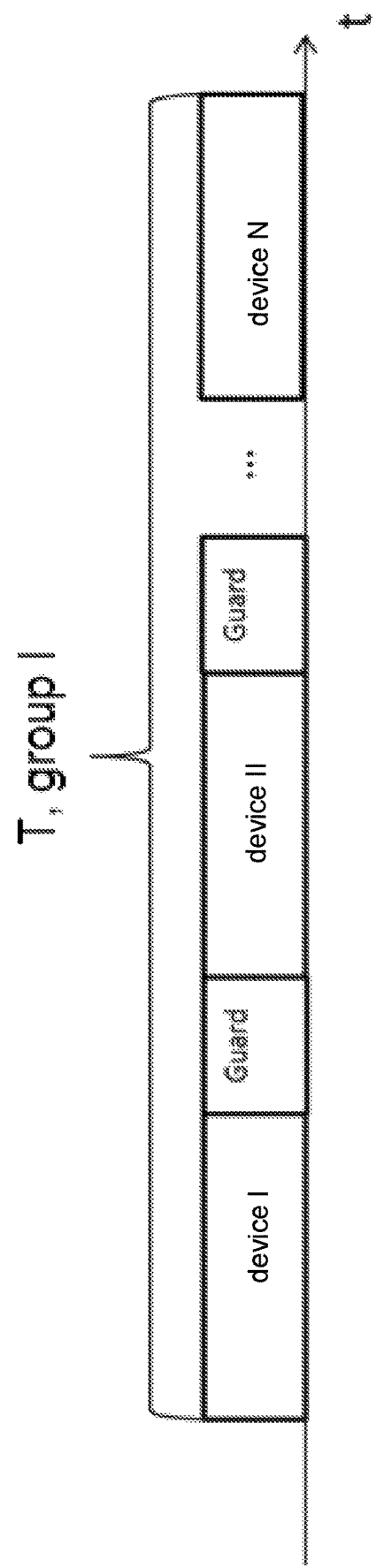
FIG. 9 shows a schematic diagram of a transmission interval with a plurality of transmission timeslots of a group of detecting devices in accordance with one embodiment.

FIG. 9 shows a schematic diagram of a transmission interval with a plurality of transmission timeslots of a group of detecting devices in accordance with one embodiment. Here, the transmission timeslots are separated from one another by a guard. The guard can be used optionally. A transmission period length T can also be provided.

In accordance with one embodiment, detecting devices with different transmission period lengths (i.e., periodicities) are assigned to different groups. The detecting devices within one group can transmit every 60 seconds, for example. The detecting devices within a further group can transmit every 30 seconds, for example.

Figure 10:
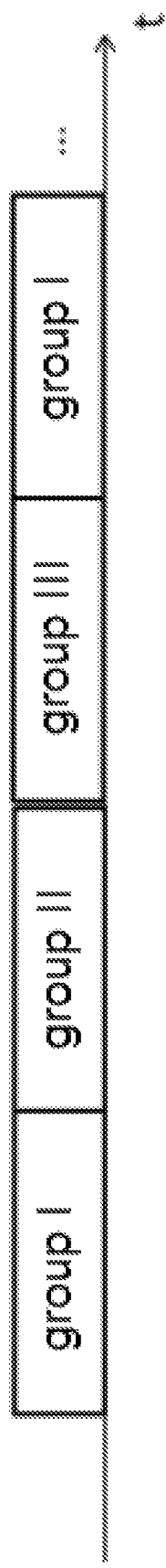
FIG. 10 shows a schematic diagram of a plurality of transmission intervals for a plurality of groups of detecting devices in accordance with one embodiment.

FIG. 10 shows a schematic diagram of a plurality of transmission intervals for a plurality of groups of detecting devices in accordance with one embodiment. The transmission intervals can be repeated periodically and/or can continue periodically.

In order to increase the maximum number of detecting devices, the same communications profile can be used in physically spaced-apart groups. The number of collisions can be further reduced as a result. Consequently, a spatial diversity is utilized. An exchange of information with regard to free transmission times and/or transmission timeslots between a plurality of server entities and also a synchronization of broadcast signal frames between the server entities can further reduce the likelihood of collisions and can further increase the system capacity.

The plurality of transmission intervals can also be assigned predetermined time-of-day intervals. By way of example, a first group can transmit between 1 o'clock and 5 o'clock in the morning, and a second group can transmit between 5 o'clock and 10 o'clock in the morning.

Figure 11:
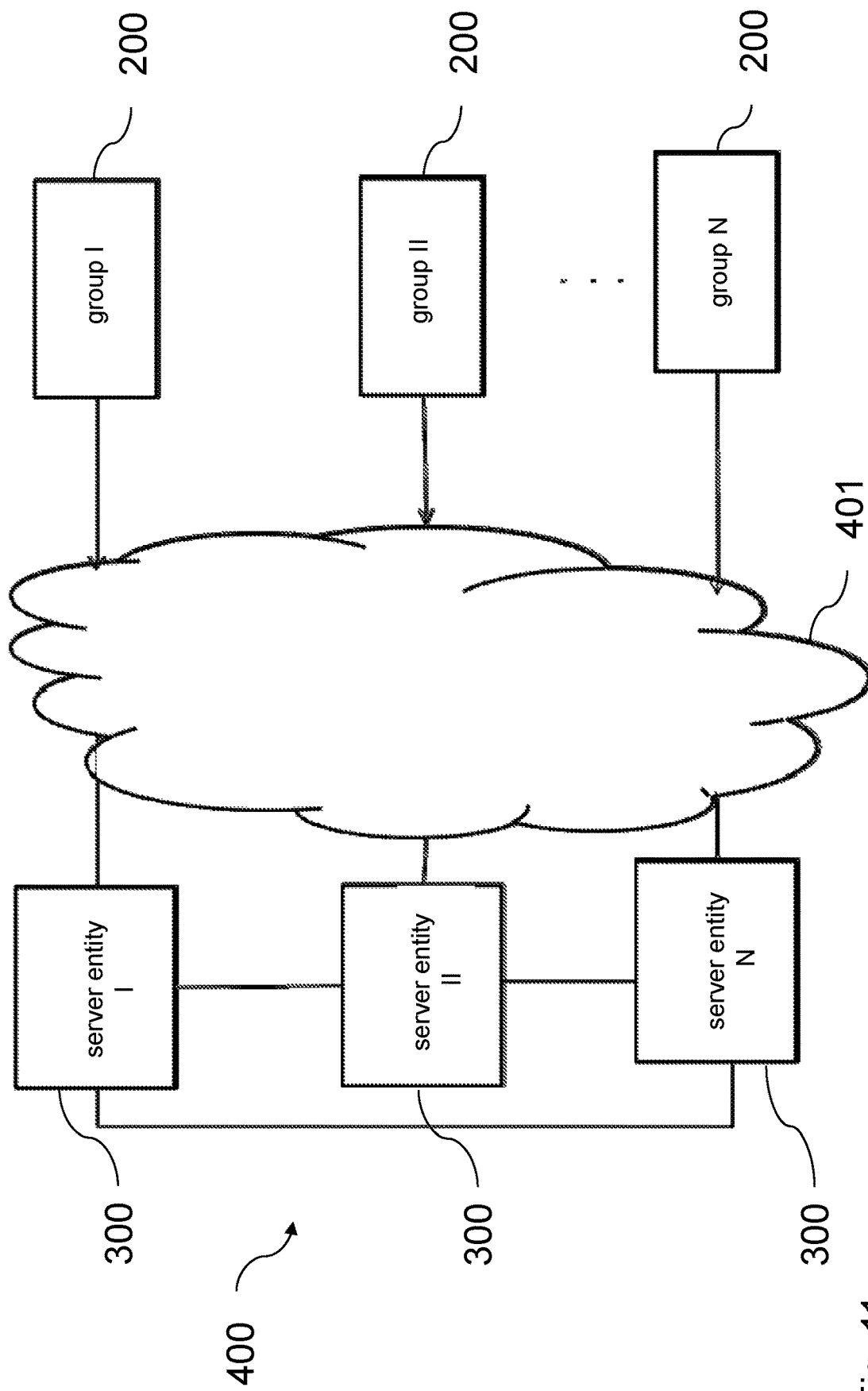
FIG. 11 shows a schematic diagram of a communications system in accordance with one embodiment.

FIG. 11 shows a schematic diagram of a communications system 400 in accordance with one embodiment. The communications system 400 comprises a plurality of groups 200 of detecting devices and a plurality of server entities 300. The plurality of groups 200 of detecting devices can communicate with the plurality of server entities 300 via a communications network 401.

The groups 200 each comprise detecting devices. Each group 200 is assigned a dedicated server entity 300. The server entities 300 can be synchronized with one another in respect of the transmission times and/or transmission timeslots. In this way, further collisions during the communication over the communications network 401 are avoided. In addition, the transfer medium is utilized efficiently in the sense of a time diversity. The system capacity is thus further increased. In addition, the server entities 300 can exchange free transmission times and/or transmission timeslots with one another and can allocate these to one another.

Figure 12:
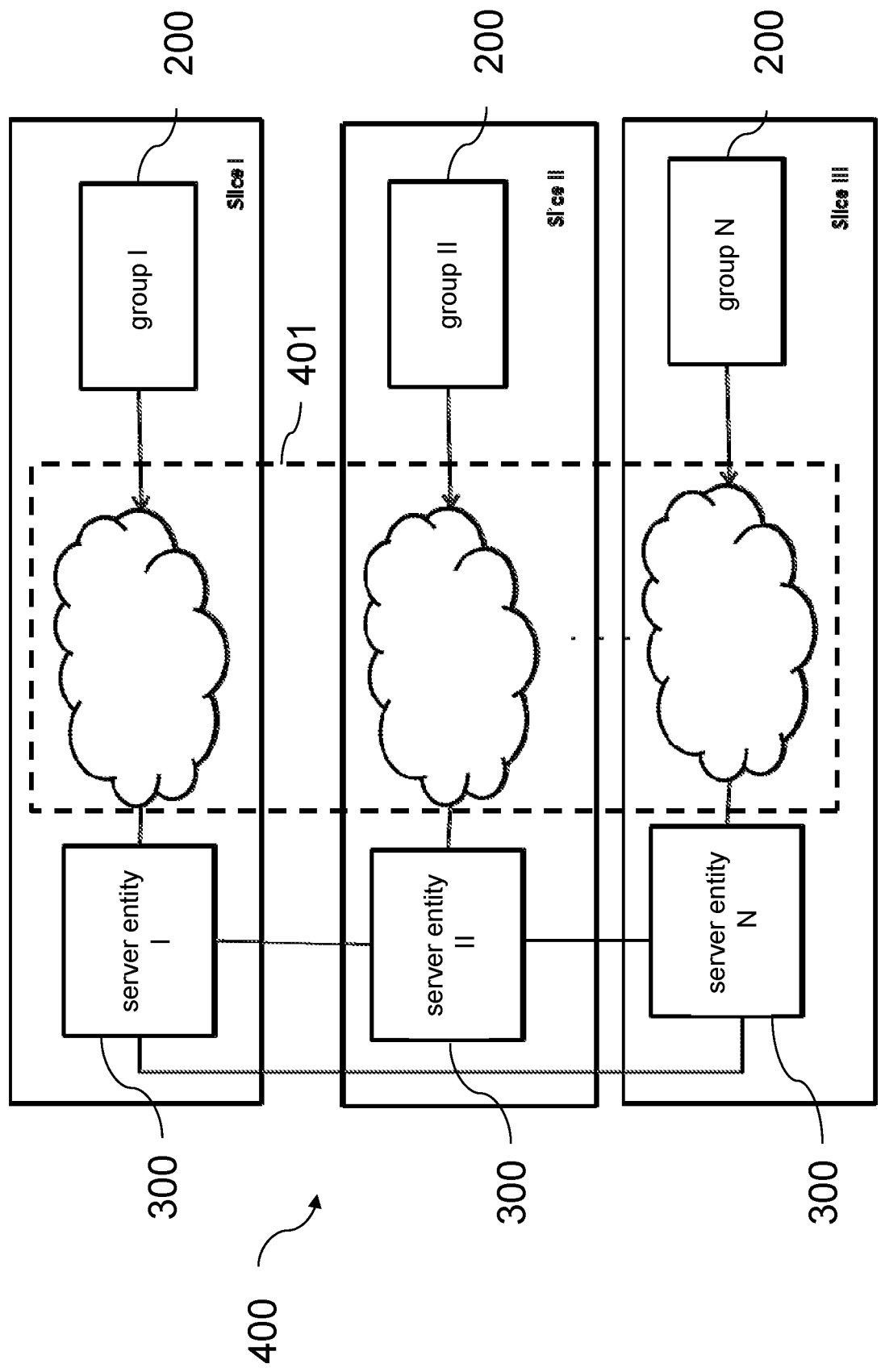
FIG. 12 shows a schematic diagram of a communications system in accordance with one embodiment.

FIG. 12 shows a schematic diagram of a communications system 400 in accordance with one embodiment. The communications system 400 comprises a plurality of groups 200 of detecting devices and a plurality of server entities 300. The plurality of groups 200 of detecting devices can communicate with the plurality of server entities 300 via a communications network 401.

The communications network 401 comprises a plurality of sub-networks. Each group 200 is assigned a specific sub-network with a specific server entity 300. The communications network 401 can be a communications network of the fifth generation (5G) or a further generation, wherein each sub-network is assigned a slice of the communications network 401. The communication between the server entities 300 can be managed in a slice management layer, which can be disposed above the infrastructure layer.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100 detecting device
101 detector
103 memory
105 communications interface
200 group of detecting devices
300 server entity
301 processor
303 communications interface
400 communications system
401 communications network
500 method for detecting a physical quantity
501 detection
503 output
505 transmission
600 method for communicating with a detecting device
601 determination
603 generation
605 transmission

The invention claimed is:

1. A detecting device for detecting a physical quantity, comprising:
   a detector, configured to detect the physical quantity and to output data representing the physical quantity;
   a memory, configured to store a communications profile of the detecting device, wherein the communications profile defines a predetermined transmission time for transmission of the data, wherein the predetermined transmission time is assigned to the detecting device;
   a timer, configured to provide a time signal, wherein the time signal indicates a time difference between a current time and a predetermined reference time, wherein the timer comprises a time signal receiver configured to provide a time synchronization signal, and wherein the predetermined transmission time for the transmission of the data is based on the time signal; and
   a communications interface, configured to transmit the data to a predetermined target network address at the predetermined transmission time via a communications network;
   wherein the communications interface is further configured to receive a broadcast signal from a server entity via the communications network, wherein the broadcast signal comprises a further communications profile assigned to the detecting device for modifying the communications profile of the detecting device;
   wherein the detecting device is a part of a first group of detecting devices physically spaced apart from a second group of detecting devices, wherein the communications profile of the detecting device is the same as a communications profile for a second detecting device of the second group of detecting devices, and wherein the communications profile of the detecting device is usable by both the detecting device and the second detecting device without collision.

2. The detecting device according to claim 1, wherein the detector is configured to determine a temperature, a moisture, an energy, a power, a position, a speed, an acceleration, an angle, an angular velocity, an angular acceleration, a rotational speed, a force, a torque, an energy consumption, a water consumption, a heat consumption, or a fuel consumption as a physical quantity.

3. The detecting device according to claim 1, wherein the predetermined transmission time defines the start of a free transmission timeslot, wherein the free transmission timeslot has a predetermined transmission timeslot length, and wherein the communications interface is configured to transmit the data within the free transmission timeslot.

4. The detecting device according to claim 1, wherein the communications network comprises a plurality of sub-networks, and wherein the communications interface is configured to transmit the data to the predetermined target network address via a sub-network of the plurality of sub-networks.

5. The detecting device according to claim 1, wherein each detecting device of the first group of detecting devices is assigned a different predetermined transmission time for the transmission of data.

6. The detecting device according to claim 1, wherein the communications network comprises a plurality of sub-networks;
   wherein each detecting device of the first group of detecting devices is assigned a different predetermined transmission time for the transmission of data, and the first group of detecting devices is assigned to a first sub-network of the plurality of sub-networks;
   wherein the second group of detecting devices is assigned to a second sub-network of the plurality of sub-networks.

7. A system, comprising:
   a plurality of dedicated server entities; and
   a plurality of groups of detecting devices, wherein each group of detecting devices of the plurality of groups of detecting devices is assigned a respective dedicated server entity from the plurality of server entities;
   wherein each dedicated server entity is configured to communicate with a respective group of detecting devices via a communications network;
   wherein each detecting device is configured to detect a physical quantity and to output data representing the physical quantity, and to store a communications profile of the detecting device, wherein the communications profile defines a predetermined transmission time for transmission of the data, wherein the predetermined transmission time is assigned to the detecting device, wherein the detecting device is configured to transmit the data to a predetermined target network address at the predetermined transmission time via the communications network;
   wherein a first dedicated server of the plurality of dedicated servers is configured to:
      determine a further communications profile of a first detecting device of a first group of detecting devices of the plurality of groups of detecting devices, wherein the further communications profile defines a predetermined transmission time for the transmission of the data, wherein the further communications profile is assigned to the first detecting device;
      generate a broadcast signal, wherein the broadcast signal comprises the further communications profile; and
      transmit the broadcast signal to the first detecting device via the communications network, to facilitate the first detecting device modifying the communications profile of the first detecting device based on the further communications profile;
   wherein the plurality of dedicated servers are synchronized with one another with respect to transmission times and/or transmission timeslots.

8. A method for detecting a physical quantity, comprising:
   detecting, by a detector of a detecting device, the physical quantity;

outputting, by the detector of the detecting device, data representing the physical quantity;

providing, by a timer of the detecting device, a time signal, wherein the time signal indicates a time difference between a current time and a predetermined reference time;

providing, by a time signal receiver of the timer, a time synchronization signal;

determining a predetermined transmission time for transmission of the data based on the time signal;

transmitting, by a communications interface of the detecting device, the data to a predetermined target network address at the predetermined transmission time via a communications network, wherein the predetermined transmission time is part of a communication profile of the detecting device stored in a memory of the detecting device;

receiving, by the communications interface of the detecting device, a broadcast signal from a server entity, wherein the broadcast signal comprises a further communications profile, wherein the further communications profile is assigned to the detecting device; and modifying, by the detecting device, the communications profile based on the further communications profile;

wherein the detecting device is a part of a first group of detecting devices physically spaced apart from a second group of detecting devices, wherein the communications profile of the detecting device is the same as a communications profile for a second detecting device of the second group of detecting devices, and wherein the communications profile of the detecting device is used by both the detecting device and the second detecting device without collision.

9. A method for communicating with a detecting device via a communications network, wherein the detecting device is configured to detect a physical quantity and to output data representing the physical quantity, wherein a communications profile of the detecting device is stored in the detecting device, wherein the communications profile defines a predetermined transmission time for transmission of the data, wherein the predetermined transmission time is assigned to the detecting device, wherein the detecting device is configured to transmit the data to a predetermined target network address at the predetermined transmission time via the communications network, wherein the method comprises:

determining, by a processor of a server entity, a further communications profile of the detecting device which defines the predetermined transmission time for the transmission of the data, wherein the further communications profile is assigned to the detecting device;

generating, by the processor of the server entity, a broadcast signal, wherein the broadcast signal comprises the further communications profile; and transmitting, by a communications interface of the server entity, the broadcast signal to the detecting device via the communications network to facilitate the detecting device modifying the communications profile based on the further communications profile;

wherein the detecting device is a part of a first group of detecting devices physically spaced apart from a second group of detecting devices, wherein the communications profile of the detecting device is the same as a communications profile of a second detecting device of the second group of detecting devices, and wherein the communications profile of the detecting device is used by both the detecting device and the second detecting device without collision.

10. A non-transitory computer-readable medium having processor-executable instructions stored thereon for detecting a physical quantity, wherein the processor-executable instructions, when executed, facilitate performance of the following:

detecting the physical quantity;

outputting data representing the physical quantity;

providing a time signal, wherein the time signal indicates a time difference between a current time and a predetermined reference time;

providing a time synchronization signal;

determining a predetermined transmission time for transmission of the data based on the time signal;

transmitting the data to a predetermined target network address at the predetermined transmission time via a communications network, wherein the predetermined transmission time is part of a communication profile of the detecting device stored in a memory of the detecting device;

receiving a broadcast signal from a server entity, wherein the broadcast signal comprises a further communications profile, wherein the further communications profile is assigned to the detecting device; and modifying the communications profile based on the further communications profile;

wherein the detecting device is a part of a first group of detecting devices physically spaced apart from a second group of detecting devices, wherein the communications profile of the detecting device is the same as a communications profile for a second detecting device of the second group of detecting devices, and wherein the communications profile of the detecting device is usable by both the detecting device and the second detecting device without collision.

11. A non-transitory computer-readable medium having processor-executable instructions stored thereon for communicating with a detecting device via a communications network, wherein the detecting device is configured to detect a physical quantity and to output data representing the physical quantity, wherein a communications profile of the detecting device is stored in the detecting device, wherein the communications profile defines a predetermined transmission time for transmission of the data, wherein the predetermined transmission time is assigned to the detecting device, wherein the detecting device is configured to transmit the data to a predetermined target network address at the predetermined transmission time via the communications network, wherein the processor-executable instructions, when executed, facilitate performance of the following:

determining a further communications profile of the detecting device which defines the predetermined transmission time for the transmission of the data, wherein the further communications profile is assigned to the detecting device;

generating a broadcast signal, wherein the broadcast signal comprises the further communications profile; and transmitting the broadcast signal to the detecting device via the communications network to facilitate the detecting device modifying the communications profile based on the further communications profile;

wherein the detecting device is a part of a first group of detecting devices physically spaced apart from a second group of detecting devices, wherein the communications profile of the detecting device is the same as a communications profile of a second detecting device of the second group of detecting devices, and wherein the communications profile of the detecting device is usable by both the detecting device and the second detecting device without collision.

12. The detecting device according to claim 3, wherein the free transmission timeslot is one of a plurality of transmission timeslots, and wherein adjacent transmission timeslots of the plurality of transmission timeslots are separated from one another by a guard.

* * * * *